US008216102B2

(12) United States Patent
Nicholson et al.

(10) Patent No.: US 8,216,102 B2
(45) Date of Patent: Jul. 10, 2012

(54) ROLLER DOOR DRIVE ADAPTER METHOD AND APPARATUS

(75) Inventors: Scott James Nicholson, Green Point (AU); Chris William Conroy, Carlingford (AU)

(73) Assignee: The Chamberlain Group, Inc., Elmhurst, IL (US)

( * ) Notice: Subject to any disclaimer, the term of this patent is extended or adjusted under 35 U.S.C. 154(b) by 972 days.

(21) Appl. No.: 12/029,029

(22) Filed: Feb. 11, 2008

(65) Prior Publication Data

US 2009/0199979 A1 Aug. 13, 2009

(51) Int. Cl.
*F16H 55/30* (2006.01)

(52) U.S. Cl. .......................... 474/152; 160/321; 74/89.2

(58) Field of Classification Search .................. 474/165, 474/198, 902, 77, 161, 152, 158, 903; 160/321, 160/310; 74/89.2, 89.21, 89.22
See application file for complete search history.

(56) References Cited

U.S. PATENT DOCUMENTS

| | | | | | |
|---|---|---|---|---|---|
| 2,451,690 | A | * | 10/1948 | Oehler | 474/95 |
| 3,162,057 | A | * | 12/1964 | Burrell | 474/152 |
| 3,789,687 | A | * | 2/1974 | Cutter | 474/152 |
| 5,137,500 | A | * | 8/1992 | Lhotak | 474/152 |
| 5,447,477 | A | * | 9/1995 | Bresson et al. | 475/154 |
| 5,698,073 | A | * | 12/1997 | Vincenzi | 160/188 |
| 2007/0072715 | A1 | * | 3/2007 | Hinterstocker et al. | 474/152 |

* cited by examiner

*Primary Examiner* — Michael Mansen
*Assistant Examiner* — Juan Campos, Jr.
(74) *Attorney, Agent, or Firm* — Fitch Even Tabin & Flannery LLP

(57) ABSTRACT

A sprocket having a slot formed therethrough can be disposed about the non-rotating support rod of a given roller door. This sprocket is then attached to the door-supporting frame such that the sprocket is positioned externally to the roller door. A connector can serve to effect this attachment. This connector might comprise a plurality of bolts with support sleeves. By this approach, the sprocket can be maintained at a fixed distance from the door supporting frame. This connector might also comprise an adjustable connector that adjustably and fixedly connects the sprocket with respect to the door-supporting frame. By one approach, the sprocket connects directly to the door-supporting frame. By another approach, if desired, the sprocket connects to a frame interface which connects, in turn, to the door-supporting frame. This frame interface can itself also have a slot formed therethrough to again facilitate placing the frame interface into an installed position.

9 Claims, 3 Drawing Sheets

ROLLER DOOR DRIVE ADAPTER METHOD AND APPARATUS

TECHNICAL FIELD

This invention relates generally to movable barrier motive mechanisms and more particularly to roller door assemblies.

BACKGROUND

Roller doors are known in the art. Such assemblies typically comprise a door-supporting frame that is retained in an installed position by a non-rotating support rod. The door-supporting frame often comprises two or more so-called wheels that are able to rotate about the non-rotating support rod. The material comprising the roller door itself (sometimes referred to as a barrier curtain) is rolled about these wheels when raised to an opened position and unrolled when moving the roller door to a closed position.

A motor typically provides this rotation of the door-supporting frame to cause this movement of the roller door. This, in turn, requires that the output shaft of the motor be somehow mechanically coupled to the door-supporting frame in order to cause the desired rotation. Numerous approaches are known in this regard. Unfortunately, while often satisfactory for some limited number of application settings, each such design often suffers one or more deficiencies as well. Points of concern can relate, for example, to ease or difficulty of installation, ease or difficulty of maintenance, relative cost, overall efficacy, and so forth.

As but one example in these regards, once installed, many existing approaches that employ a sprocket to mechanically couple the motor to the door-supporting frame can require that the non-rotating support rod be disconnected from an installed position. This can be troublesome, time consuming, and potentially even dangerous. This, in turn, can increase the requisite level of skill required for the installer and this can contribute significantly to a higher effective cost being associated with such an approach.

BRIEF DESCRIPTION OF THE DRAWINGS

The above needs are at least partially met through provision of the roller door drive adapter method and apparatus described in the following detailed description, particularly when studied in conjunction with the drawings, wherein.

Figure 6:
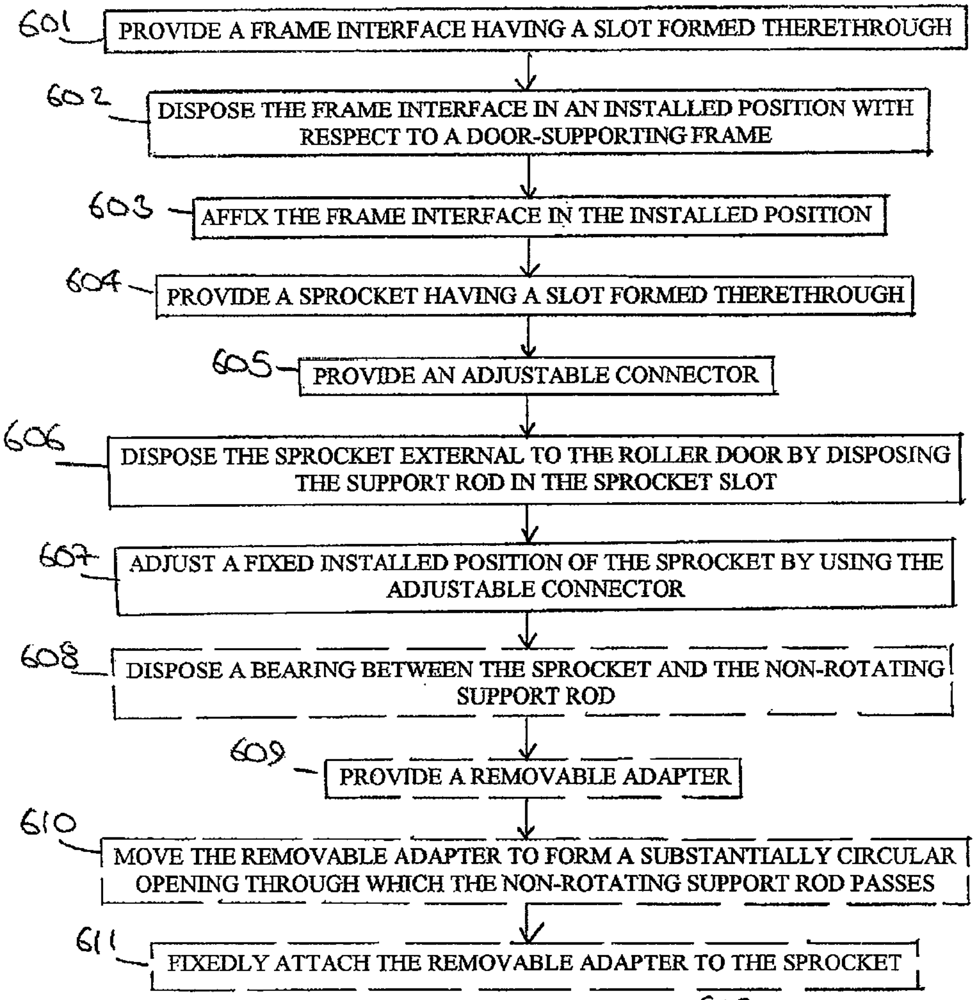
FIG. 6 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a sprocket having a slot formed therethrough can be disposed about the non-rotating support rod of a given roller door without requiring that the non-rotating support rod be disconnected from an installed position. This sprocket is then attached to the door-supporting frame such that the sprocket is positioned externally to the roller door to thereby facilitate coupling a drive mechanism to the sprocket.

By one approach, a connector serves to effect the aforementioned attachment. This connector might comprise, for example, a plurality of bolts with support sleeves that are fixedly attached to the door-supporting frame. By this approach, the sprocket can be maintained at a fixed distance from the door supporting frame. This connector might also comprise, if desired, an adjustable connector that adjustably and fixedly connects the sprocket with respect to the door-supporting frame to achieve the desired positioning of the sprocket with respect to the roller door.

By one approach, the sprocket connects directly to the door-supporting frame. By another approach, if desired, the sprocket connects to a frame interface which connects, in turn, to the door-supporting frame. This frame interface can itself also have a slot formed therethrough to again facilitate placing the frame interface into an installed position without requiring the non-rotating support rode to be disconnected from an installed position.

So configured, a sprocket can be readily, efficiently, quickly, reliably, and inexpensively mechanically coupled to the door-supporting frame and positioned external to the roller door to thereby facilitate the ease by which a drive chain, belt, or the like can operably couple this sprocket to the roller door motor. This, in turn, permits great flexibility with respect to the placement and installation of the motor.

Figure 1:
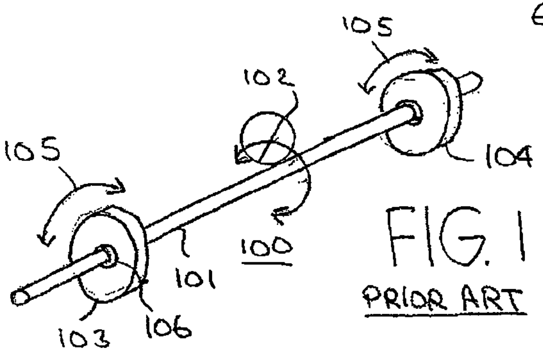
FIG. 1 PRIOR ART
FIG. 1 comprises a perspective schematic view as configured in accordance with the prior art.

These and other benefits may become clearer upon making a thorough review and study of the following detailed description. Referring first to FIG. 1, it may be helpful to first provide further elaboration regarding certain aspects of the prior art. Certain components of a typical roller door assembly 100 are shown to include a non-rotating support rod 101. As denoted by reference numeral 102, this means in particular that the non-rotating support rod 101 is unable, once installed, to rotate about its longitudinal axis. Brackets (not shown) of one kind or another are typically employed at either end of the non-rotating support rod 101 to both hold the non-rotating support rod 101 at the desired location and to also prohibit the aforementioned rotation. This non-rotating support rod 101 is often comprised of a strong metal such as iron or steel though other materials can serve in an appropriate application setting.

The roller door assembly 100 will also typically include a door-supporting frame that often comprises, as shown, two or more wheels 103 and 104 that are disposed somewhat proximal to the opposing ends of the non-rotating support rod 101. Unlike the non-rotating support rod 101, these wheels 103 and 104 are free to rotate (as denoted by reference numeral 105). In particular, these wheels 103 and 104 can freely rotate about the non-rotating support rod 101. Bearings 106 are often employed to particularly facilitate this rotational freedom.

So configured, an upper end of a door curtain (not shown) can be attached to the roller door assembly 100 and then rolled around the wheels 103 and 104 by causing one or more of the wheels to rotate. This in turn permits the door material to be rolled up (and hence raised up to an open position) and rolled down (and hence lowered down to a closed position) by causing the wheel(s) to rotate in the desired direction.

Figure 2:
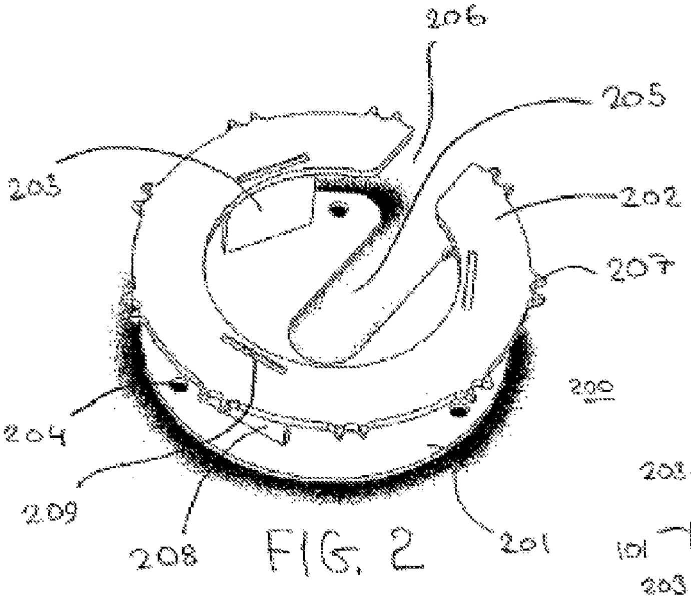
FIG. 2 comprises a perspective view as configured in accordance with various embodiments of the invention.

Referring now to FIG. 2, a drive adapter 200 suitable for use in such an application setting will be described. This drive adapter 200 generally includes a frame interface 201, a sprocket 202, and an adjustable connector 203.

The frame interface 201 is configured and arranged to affixedly couple to the aforementioned door-supporting frame of a roller door assembly. In this particular illustrative example, and presuming that the door-supporting frame comprises, at least in part, a rotatable wheel as described above, the frame interface 201 has a corresponding circular shape as well. This frame interface 201 has a plurality of holes 204 formed therethrough to facilitate this attachment to the door-supporting frame. By one approach, for example, these holes 204 can be juxtaposed with corresponding holes that are formed in or that are otherwise available in the door-supporting frames and bolts, self-tapping screws, or other affixment members of choice can be inserted therethrough to hold these two components together during use.

This frame interface 201 also includes a slot 205 that is formed therethrough to facilitate placing the frame interface 201 into an installed position without requiring the non-rotating support rod of the roller door assembly to be disconnected from an installed position. As shown, this slot 205 can extend inwardly from the periphery of the frame interface 201 and can encompass a central portion of the frame interface 201. So configured, those skilled in the art will recognize and appreciate that the frame interface 201 can be placed in a working position by guiding the non-rotating support rod through the slot 205 until the non-rotating support rod is in the vicinity of that central portion of the frame interface 201. For many application settings, the frame interface 201 will likely not contact the non-rotating support rod once affixed in an installed position.

The sprocket 202 also has a similar slot 206 formed therethrough to again facilitate placing the sprocket 202 into an installed position without requiring the non-rotating support rod to be disconnected from an installed position. As with the frame interface slot 205, this sprocket slot 206 can extend inwardly from the periphery of the sprocket 202.

In this illustrative example, the sprocket 202 is (with the notable exception of the aforementioned sprocket slot 206) essentially annular in shape. The internal open area can serve not only to facilitate the proper positioning of the sprocket 202 but can also serve as an access hole of sufficient size and shape to serve as a point of access for a tool (or tools) by which the drive adapter 200 can be properly installed and positioned. As but one example in this regard, this access hole can be of sufficient size and shape to accommodate an average-sized adult human hand if desired. Other tools may of course be accommodated as desired.

Being a sprocket, the sprocket 202 of course has sprocket teeth 207 formed about its periphery. These sprocket teeth 207 can be provided about the entire periphery if desired (excluding, of course, that portion of the periphery that comprises the sprocket slot 206) but can also be disposed partially, but not fully, about the sprocket's periphery as shown.

Figure 3:
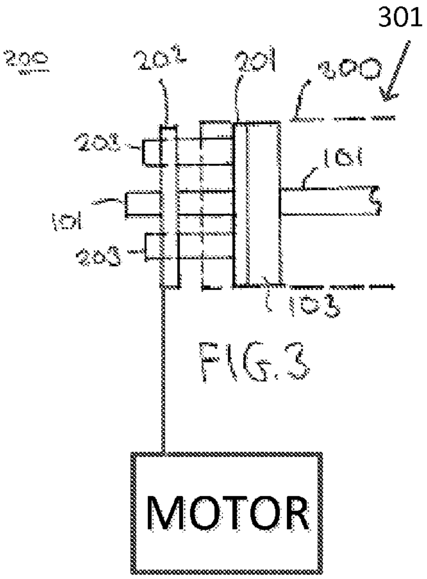
FIG. 3 comprises a side elevational schematic view as configured in accordance with various embodiments of the invention.

The aforementioned adjustable connector 203 serves to adjustably, yet fixedly connect the sprocket 202 to the frame interface 201 such that the sprocket 202 is positioned externally to the roller door to thereby facilitate coupling a drive mechanism to the sprocket 202. This result is illustrated in FIG. 3. The various components of the drive adapter 200 are shown in their installed positions. Accordingly, the frame interface 201 is affixed to and in contact with the door-supporting frame 103 and the sprocket 202 is affixed to the frame interface 201 via the adjustable connector 203 such that the sprocket 202 is positioned externally to the material 300 that comprises the roller door 301 (with that material 300 being shown using phantom lines).

Those skilled in the art will recognize and appreciate that the sprocket 202 can be readily connected to a motor using any drive linkage of choice (such as a chain or a belt). Rotational movement of the sprocket 202 as caused by the motor, in turn, is readily translated and conveyed to the door-supporting frame 103 via the frame interface 201 which is affixedly mechanically connected to the sprocket 202 as described above.

Referring now to both FIGS. 2 and 3, the adjustable connector 203 can be realized using any of a number of mechanisms. By one approach, and as illustrated, the adjustable connector 203 can comprise a plurality of spacers 208 that are affixed at one end to the frame interface 201 and which extend outwardly and substantially perpendicularly to the frame interface 201. In this illustrative example there are three such spacers 208. The sprocket 202, in turn, has corresponding spacer openings 209 formed therethrough to receive these spacers 208. These openings 209 are sized so that they snuggly receive a corresponding spacer 208 while nevertheless permitting some movement to thereby permit ready adjustment of the relative position of the sprocket 202 with respect to the frame interface 201. The tightness of this fit should be sufficient to maintain the relative position of the sprocket 202 to the frame interface 201 in the desired installed position.

Generally speaking and as illustrated, the adjustable connector 203 serves to connect the sprocket 202 to the frame interface 201 such that these two components are substantially co-axial to, and substantially parallel to, one another. Depending upon the application setting, however, other possibilities could be employed. For example, if desired, the sprocket 202 and frame interface 201 could be positioned eccentrically to one another rather than co-axially.

If desired, the installed position of the sprocket 202 can be further maintained by using additional attachment mechanisms (not shown) as desired. This could comprise any of a variety of adhesives, set screws, clips, pins, and so forth. As illustrated in FIG. 3, these spacers 208 extend outwardly beyond the sprocket 202 when the sprocket 202 has been properly installed in this example. Other possibilities of course exist. For example, it would be possible to provide a plurality of spacers 208 having different lengths. In such a case, the spacer 208 might not extend through and beyond the sprocket 202 but could instead be lodged within a cavity in the sprocket 202 that extends only partly into the sprocket 202 as versus all the way through the sprocket 202.

These various components of the drive adapter 202 can be comprised of any of a variety of materials. By one approach, some or all of these components can be comprised of plastic. This can include, if desired, forming at least a substantial portion of the drive adapter of plastic.

Figure 4:
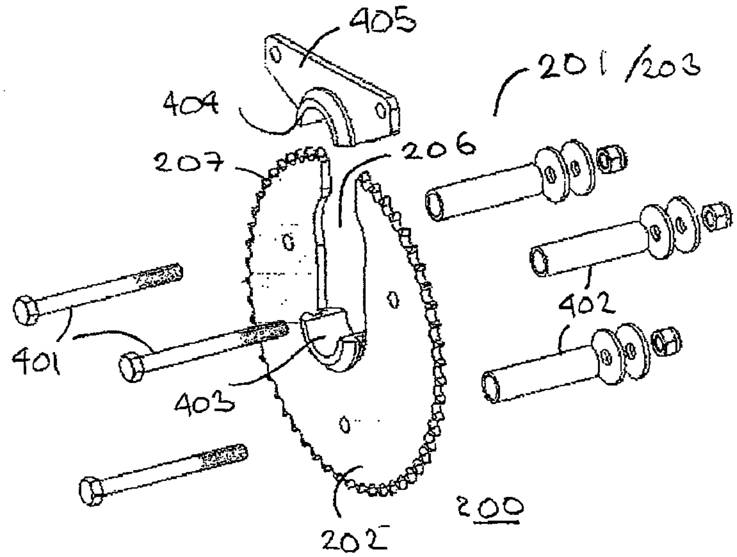
FIG. 4 comprises an exploded perspective view as configured in accordance with various embodiments of the invention.

Those skilled in the art will recognize and appreciate that numerous other embodiments can benefit from these essential teachings. With reference to FIG. 4, for example, if desired, the frame interface 201 and the connector 203 can be highly integrated with one another. To illustrate using the provided example, these two components can be jointly formed using a plurality of bolts 401 and corresponding support sleeves 402 that, in combination with such washers and nuts as may be useful or appropriate in a given application setting, serve to maintain the sprocket 202 at the desired fixed distance from the door-supporting frame (not shown). These bolts 401, for example, can pass through corresponding holes as are provided in, or as are otherwise formed in, the door-supporting frame itself. Bolts 401 and support sleeves 402 of varying lengths can be provided to permit the aforementioned adjustability with respect to the installed positioning of the sprocket 202.

Figure 5:
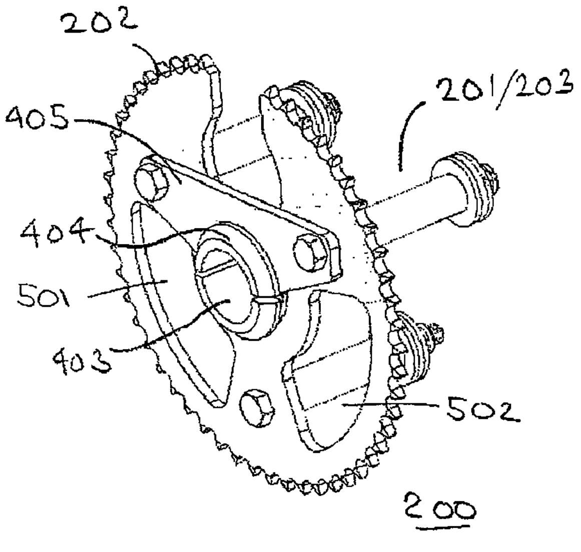
FIG. 5 comprises a perspective view as configured in accordance with various embodiments of the invention.

Also in the example shown, the sprocket 202 is configured and arranged to be in rotational contact with the non-rotating support rod (not shown) of the roller door assembly. This includes, in this illustrative example, a split bearing having a first bearing half 403 that is mounted within the sprocket slot 206 and a second bearing half 404 that is mounted on a removable adapter 405. The removable adapter 405, in turn, comprises a piece that can be fixedly attached to the sprocket 202 (as shown, for example, in FIG. 5) when the sprocket 202 is in the installed position to thereby further facilitate maintaining the sprocket 202 in the installed position with respect to the non-rotating support rod. Those skilled in the art will again appreciate and recognize that such a configuration permits both the sprocket 202 (via the sprocket slot 206) and the split bearing (by virtue of its two bearing halves 403 and 404) to be installed without requiring that the non-rotating support rod itself be disconnected or otherwise disturbed.

By these approaches, the removable adapter 405, in combination with the sprocket slot 206, forms a substantially circular opening through which the non-rotating support rod can pass when the sprocket 202 is in the installed position and the removable adapter 405 is fixedly attached to the sprocket 202. This circular opening can further accommodate a split bearing as shown as desired to thereby facilitate the sprocket 202 and the removable adapter 405 freely rotating about the non-rotating support rod in keeping with the purposes described herein.

By one approach, the aforementioned removable adapter 405 can be comprised of a same material as the sprocket 202 itself. It is also possible, as shown, to secure the removable adapter 405 to the sprocket 202 by use of the same attachment mechanisms as serve to secure the sprocket 202 to the door-supporting frame. This can comprise, for example, providing holes through the removable adapter 405 such that those holes align properly with other holes in the sprocket 202 when the two components are otherwise properly positioned and aligned with respect to one another. (As used herein, the expression "removable adapter" will be understood to refer to a component that is, by design, intentionally configured to be separate from the sprocket 202 during the installation process and which is then intended to be maintained in a fixed and attached position with respect to the sprocket 202 unless and until it might later be desired to intentionally remove the adapter 405 by reversing the installation and securement process. This expression is not intended to include components and portions of components that are removable only in the sense of destroying or severing material as may comprise the component itself or that to which the component is attached.)

Other differences can be accommodated as well as desired. For example, and referring again to FIG. 4, the sprocket 202 can comprise a plate having only the sprocket slot 206 and the aforementioned holes if desired. Or, and referring now again to FIG. 5, the sprocket 202 can have one or more access holes 501 and 502 disposed therethrough. As noted above, these access holes 501 and 502 can be of sufficient size and shape to serve as a point of access (towards the interior of the roller door assembly) for one or more tools that can serve, for example, to affix the sprocket 202 to the door-supporting frame by any of the aforementioned techniques and approaches. This can include a wide variety of tools including, but not limited to, the average-sized adult human hand.

An illustrative process that is compatible with many of these teachings will now be presented. With reference now to FIG. 6, a corresponding process 600 can serve to provide 601 a frame interface having a slot formed therethrough. As noted above, this slot can serve to position the frame interface in place without requiring that the non-rotating support rod be displaced from an installed position and configuration. This process 600 can then serve to dispose 602 this frame interface in an installed position with respect to a corresponding door-supporting frame (again, without disconnecting the non-rotating support rod from an installed position) by disposing the non-rotating support rod in the frame interface slot. The frame interface can then be affixed 603 in the installed position with respect to the door-supporting frame. This step can comprise using, for example, affixment members of choice that are disposed (at least partially) through a corresponding plurality of holes in the frame interface.

This process 600 can then serve to provide 604 a sprocket having a slot formed therethrough and to also provide 605 an adjustable connector of choice. The sprocket can then be disposed 606 external to the roller door by disposing the non-rotating support rod in the sprocket slot and the fixed installed position of the sprocket with respect to the frame interface then adjusted 607 by use of the adjustable connector such that the sprocket is positioned externally to the roller door to thereby facilitate coupling a drive mechanism to the sprocket.

This process 600 can accommodate other steps as may be desired. This can include, for example, disposing 608 a bearing (such as a split bearing) between the sprocket and the non-rotating support rod. The latter step, in turn, may be facilitated by providing 609 a removable adapter (such as the removable adapter described herein) and moving 610 the removable adapter to form a substantially circular opening through which the non-rotating support rod passes. In such a case, the removable adapter can then be fixedly attached 611 to the sprocket to maintain the relative position of these components once installed.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. This will also be understood to encompass various combinations and permutations of the various components that have been set forth in these teachings.

We claim:

1. A method for coupling a roller door with a drive mechanism, the roller door being supported by a door-supporting frame about which the roller door is rolled when opened and closed, and which frame includes a non-rotating support rod that holds the roller door, the method comprising:

moving a frame interface into engagement with the door-supporting frame without disconnecting the non-rotating support rod from the frame, the frame interface having a radially extending frame interface slot, the frame interface slot being moved over the non-rotating support rod so that the frame interface at least partially surrounds the non-rotating support rod;

affixing the frame interface to the door-supporting frame;

moving a sprocket having a radially extending sprocket slot over the non-rotating support rod without disconnecting the non-rotating support rod from the frame, the sprocket slot being moved over the non-rotating support rod so that the sprocket at least partially surrounds the non-rotating support rod and is laterally spaced from the frame interface and the roller door;

adjusting the distance of the sprocket with respect to the frame interface by use of one or more adjustable connectors to adjust the lateral space between the sprocket and the frame interface such that the sprocket is laterally spaced from the frame interface and is positioned externally to the roller door to thereby facilitate coupling a drive mechanism to the sprocket.

2. The method of claim 1 wherein the frame interface comprises, at least in part, a plurality of holes disposed therethrough and where affixing the frame interface in the stalled position comprises affixing the frame interface to the door-supporting frame using affixment members that are at least partially disposed in the plurality of holes.

3. The method of claim 1 wherein the frame interface slot extends inwardly from a periphery of the frame interface.

4. The method of claim 3 wherein the frame interface slot extends inwardly to encompass a central portion of the frame interface.

5. The method of claim 1 wherein the sprocket has sprocket teeth disposed partially, but not fully, about a periphery of the sprocket.

6. The method of claim 1 wherein disposing the sprocket external to the roller door by disposing the support rod in the sprocket slot comprises disposing the sprocket and the frame interface such that the sprocket and the frame interface are substantially co-axial to and substantially parallel to one another.

7. The method of claim 6 wherein the adjustable connector comprises a plurality of spacers.

8. The method of claim 7 wherein the sprocket has spacer openings disposed therein for snuggly receiving the plurality of spacers such that a distance between the frame interface and the sprocket is readily adjusted to a desired position by moving the sprocket with respect to the frame interface and wherein the sprocket and the frame interface are maintained in the desired position due at least in part to a snug interaction between the spacers and the spacer openings.

9. A method of installing a drive mechanism onto a roller door having a door-supporting frame about which the roller door is rolled when being opened and closed, the door-supporting frame having a non-rotating support rod that is mounted to a support wall and at least one wheel rotatably disposed about the non-rotating support rod, the method comprising:

mounting a frame interface having a frame interface slot by disposing the frame interface slot around the non-rotating support rod;

securing the frame interface with respect to the at least one wheel, which is rotatably disposed about the non-rotating support rod;

mounting a sprocket external to an end of the roller door, the sprocket having a radially extending sprocket slot and disposing the radially extending sprocket slot around the non-rotating support rod;

connecting the sprocket to the frame interface via an adjustable connector such that the sprocket laterally spaced from the frame interface and is securely installed in a position external to the roller door to thereby facilitate coupling a drive mechanism to the sprocket.

* * * * *

UNITED STATES PATENT AND TRADEMARK OFFICE

CERTIFICATE OF CORRECTION

PATENT NO. : 8,216,102 B2
APPLICATION NO. : 12/029029
DATED : July 10, 2012
INVENTOR(S) : Scott James Nicholson and Chris William Conroy It is certified that error appears in the above-identified patent and that said Letters Patent is hereby corrected as shown below:

ON TITLE PAGE:

Line (73) Assignee: Change "The Chamberlain Group, Inc., Elmhurst, IL (US)" to
-- Chamberlain Australia PTY LTD., New South Wales (AU) --

Signed and Sealed this
Twenty-third Day of April, 2013

Teresa Stanek Rea
*Acting Director of the United States Patent and Trademark Office*